(12) United States Patent
Vlahos

(10) Patent No.: US 6,860,604 B1
(45) Date of Patent: Mar. 1, 2005

(54) METHOD AND APPARATUS FOR INHIBITING THE PROJECTION OF A SHADOW OF A PRESENTER ONTO A PROJECTION SCREEN

(75) Inventor: Paul Vlahos, Tarzana, CA (US)

(73) Assignee: Imatte, Inc., Chatsworth, CA (US)

( * ) Notice: Subject to any disclaimer, the term of this patent is extended or adjusted under 35 U.S.C. 154(b) by 0 days.

(21) Appl. No.: 10/754,147

(22) Filed: Jan. 9, 2004

(51) Int. Cl.[7] .................. G03B 21/26; G03B 21/14; G03B 21/00
(52) U.S. Cl. .................. 353/28; 353/94; 353/97; 353/122
(58) Field of Search .................. 353/94, 97, 122, 353/28, 98, 119, 69, 79, 70, 21, 29, 80, 121; 348/586, 590, 607, 744; 382/173, 174

(56) References Cited

U.S. PATENT DOCUMENTS 5,270,820 A * 12/1993 Fellinger .................. 348/586
6,361,173 B1    3/2002 Vlahos et al.
6,454,415 B1 * 9/2002 Vlahos .................. 353/30

* cited by examiner

Primary Examiner—Judy Nguyen
Assistant Examiner—Rochelle Blackman
(74) Attorney, Agent, or Firm—Blakely Sokoloff Taylor & Zafman

(57) ABSTRACT

A method for projecting an image onto a front projection screen without the image being projected onto a presenter and without the presenter casting a shadow. Left and right rectilinear corrections of an image are simultaneously projected onto the screen from each of two positions that are off-axis on opposite sides of the centerline of the screen such that both projections register as a single image. A center of mass of the presenter's silhouette is generated. A vertical join line is located on the screen directly behind said presenter's center of mass. The portion of the projected image from the left projector that extends to the right of the join-line is inhibited. The portion of the projected image from the right projector that extends to the left of the join-line is also inhibited thereby providing the full projected image on the screen from the left and right image segments, without either segment projecting said image onto the presenter, and without casting the presenter's shadow onto the screen.

17 Claims, 3 Drawing Sheets

METHOD AND APPARATUS FOR INHIBITING THE PROJECTION OF A SHADOW OF A PRESENTER ONTO A PROJECTION SCREEN

BACKGROUND OF THE INVENTION

U.S. Pat. No. 6,361,173 describes a projection system in which selective pixels in a projected image are inhibited so as not to project onto a subject (presenter) when the presenter walks in front of the projection screen. A preferred means for locating those image pixels projecting onto the presenter is the use of an infrared camera combined with infrared lamps to flood the screen with infrared illumination. The difference of the infrared reflection, between the presenter and screen, identifies those pixels in the presenter area.

Inhibiting the projected image from illuminating the presenter, permits the presenter to look toward his audience without being blinded by the projector. The prevention of the image from being projected onto the presenter's body also eliminates the distortion of that portion of the image, which is so disturbing to an audience.

Selective inhibition greatly aids the comfort and freedom of motion of the presenter. The presenter already blocks a portion of the screen image from view, while a second area is being blocked for many viewers by his shadow.

BRIEF SUMMARY OF THE INVENTION

A presenter's shadow is eliminated by projecting an image from two electronic projectors located from about 45 degrees on each side of the screen centerline, and above screen center. Each projector is provided with rectilinear correction so that both images overlap and register on the screen.

An infrared camera locates the presenter's silhouette from which the presenter's center of mass is calculated. The image from the left projector is selectively inhibited so as not to project an image onto the screen to the right of a join line directly behind the presenter's center. The right projector is similarly inhibited so as not to project an image to the left of the join line. The two image segments join behind the presenter to form one complete projected image.

When the presenter moves across the screen, the image join-line tracks the presenter and remains behind him. With the presenter spaced out from the screen by at least 18 inches, the presenter casts no shadow. The presenter, not being illuminated (blinded) by either projector, may look directly at his audience in comfort.

DETAILED DESCRIPTION OF THE INVENTION

Figure 1:
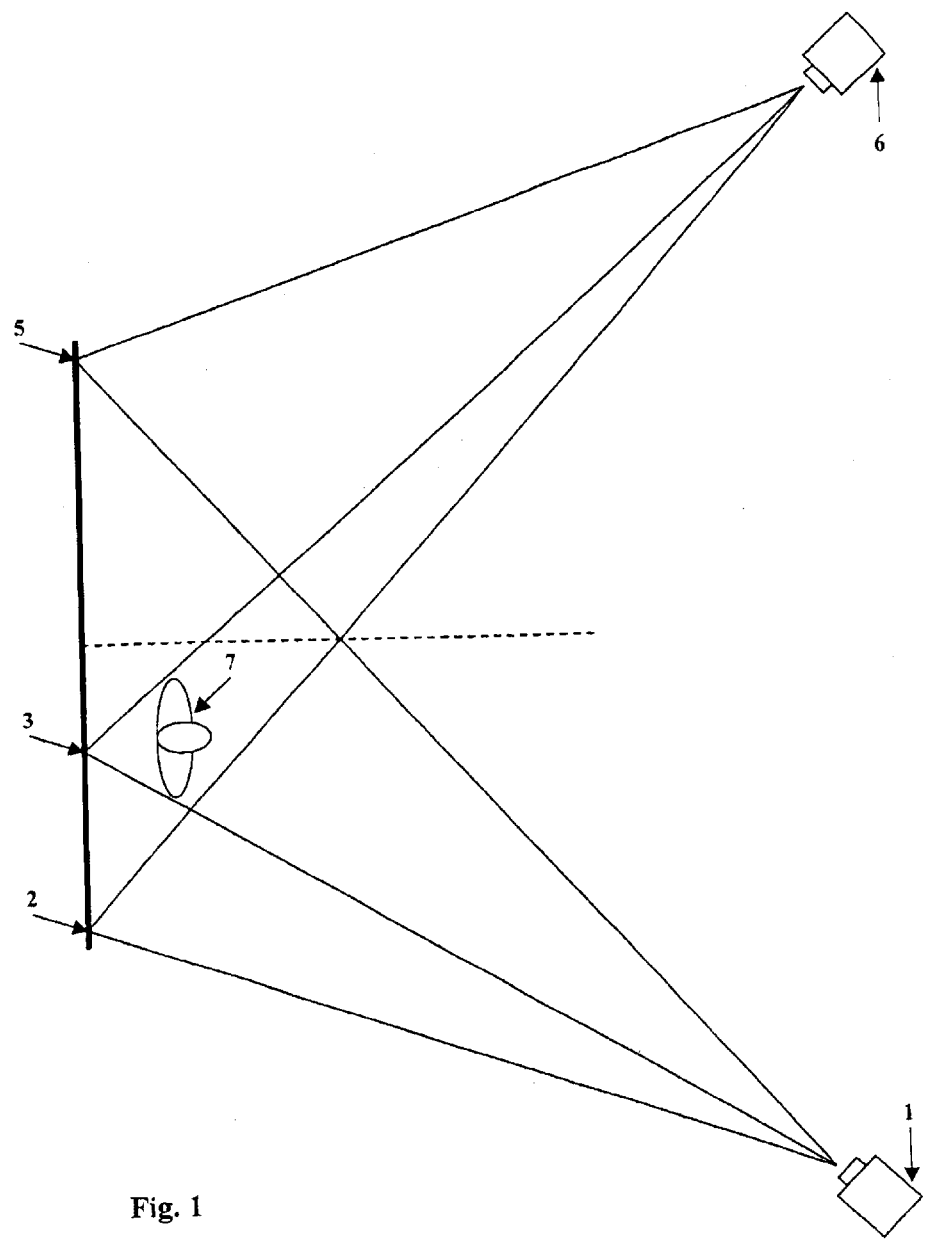
FIG. 1 is a plan view showing the placement of a presenter before a front projection screen and the location of two electronic image projectors and infrared cameras.

Referring to FIG. 1, an electronic image projector and an infrared camera and illuminator are located at point 1. A second electronic image projector and an infrared camera and illuminator are located at point 6. An infrared camera and illuminator at points 1 and 6 are located just under or over, and in close proximity, to the image projector. A presenter 7 is located about eighteen inches or more from the projection screen. In FIG. 1 the equipment at points 1 and 6 are shown at an angle of about 45 degrees from screen center, and elevated toward the ceiling. The shape of the room and the ceiling height determines the actual location of points 1 and 6 for the placement of the projectors and cameras.

The two image projectors (points 1 and 6,) while off screen center in the horizontal plane will also be off-center vertically, being located near the ceiling of the room. Rectilinear correction of the projected image is therefore made in both axes.

In photographic technology, rectilinear correction of an off center camera is achieved by shifting the camera lens in both horizontal and vertical planes, to obtain a physically square photographic image of a physically square object.

In the case of electronic projectors, the required image distortion to compensate for off-axis projection may be achieved electronically by pre-distorting the image before it is projected.

The infrared illuminator is a small infrared lamp and reflector that illuminates the projection screen from positions 1 and 6 with near-infrared light. The infrared camera at positions 1 and 6 provide detection of the pixels defining the presenter's silhouette as seen from each of the positions 1 and 6. Using these two silhouettes, the center of mass of each silhouette is calculated to locate its approximate center. This calculation is made from the left and right camera views, and the average of their two centers of mass becomes the presenter's approximate center of mass. This approximate center of the presenter will be used to locate a vertical join line.

The two projectors, one on each side of the screen, each project the same image onto the screen. With rectilinear correction, the left image overlaps and registers with the image from the right projector. Part of the image from the left projector is inhibited. The remaining image segment appears on the screen only to the left of a vertical join line behind the center of the presenter.

The right projector is similarly inhibited so that its image segment appears on the screen only to the right of the vertical join line. The two image segments meet at the join line behind the presenter.

As can be seen in FIG. 1, with the presenter placed in front of the screen by about his body width, the left and right segments of the projected image join behind the presenter to form a complete image without introducing a shadow. As the presenter moves about in front of the screen, the infrared cameras track the location of the presenter. The join line of the two off-axis projectors therefore follows and remains behind the presenter. The two images also join on the screen above the presenter's head.

Each projector has been inhibited from projecting beyond the join line. The two infrared cameras each generate a silhouette of the presenter from their individual points of view. Each projector is also inhibited in the silhouette area of the presenter. Because of the off-axis projection of each image segment, neither image segment will project its image onto the presenter. Therefore, there appears to be no need for inhibiting either projector in the presenter's silhouette area.

However, the presenter can at any time extend his hand and arm into either projection beam (1-3-2 and 6-3-5) when pointing to identify an item in the projected screen image. The inhibit function however, being always functioning within the silhouette of the presenter, will prevent projection onto the extended hand and arm. The hand and arm, being close to the screen will largely cover their own shadow.

In the process of obtaining rectilinear correction for off-axis projection, and because of the wide off-axis projection angle, the luminance at the left and right edges of the screen are not likely to be equal, thus emphasizing the visibility of the join line above the presenter's head.

The joining of two areas of identical color but of different luminance is visible when the luminance difference between the two areas is as small as one percent. Luminance non-uniformity is likely to be induced by rectilinear correction, by wide-angle off-axis projection where there is a difference in the distance to the near and far screen edges, and by the projectors own optics. All of these luminance variations combine to form a luminance distribution pattern on the screen, and a visible join line.

A uniform screen luminance is achieved by adding the inverse of the luminance distribution pattern when projecting a white field to the electronic signal provided to the projector. The remaining join line visibility, if any, can be reduced by a short dissolve from one image segment into the other.

The projection screen may also cause a visible join line when its surface is a semi-matte finish. A matte white screen will have a uniform luminance distribution of 180 degrees, and will not induce a join line.

The procedures described above provide the presenter with full freedom of motion across the stage in front of the projection screen, without intercepting either projection beam. At no time will the projected image fall upon the presenter because the two projectors are selectively inhibited within the silhouette of the presenter as seen from each projector. This also means that the presenter does not see the blinding glare of the projector lenses. Without projection glare blinding the presenter, he may look in comfort toward his audience.

A viewer, when seated off-center, usually sees the presenter's shadow. Because of the dual projection, the audience sees no shadow. The audience normally sees a disturbing distortion of the projected image when the presenter steps in front of the projection screen. With off-center projection and selective inhibition, the projected image will never fall upon the presenter even when the presenter extends an arm into either projection beam.

The silhouette of the presenter accurately defines the presenter area as seen from each projector, and these pixels are inhibited (i.e. made black). These same pixels may then be assigned a selected illumination signal. This signal provides low-level supplemental illumination of the presenter in a darkened auditorium. The supplemental illumination is assigned a luminance level and, if desired, a color. This supplemental illumination does not extend beyond the presenter and therefore does not washout the projected screen image.

With the two projectors located high and well to the sides of the room, the presenter may look at his audience in relative comfort even when he receives supplemental illumination from the two projectors.

Alternatives

Figure 2:
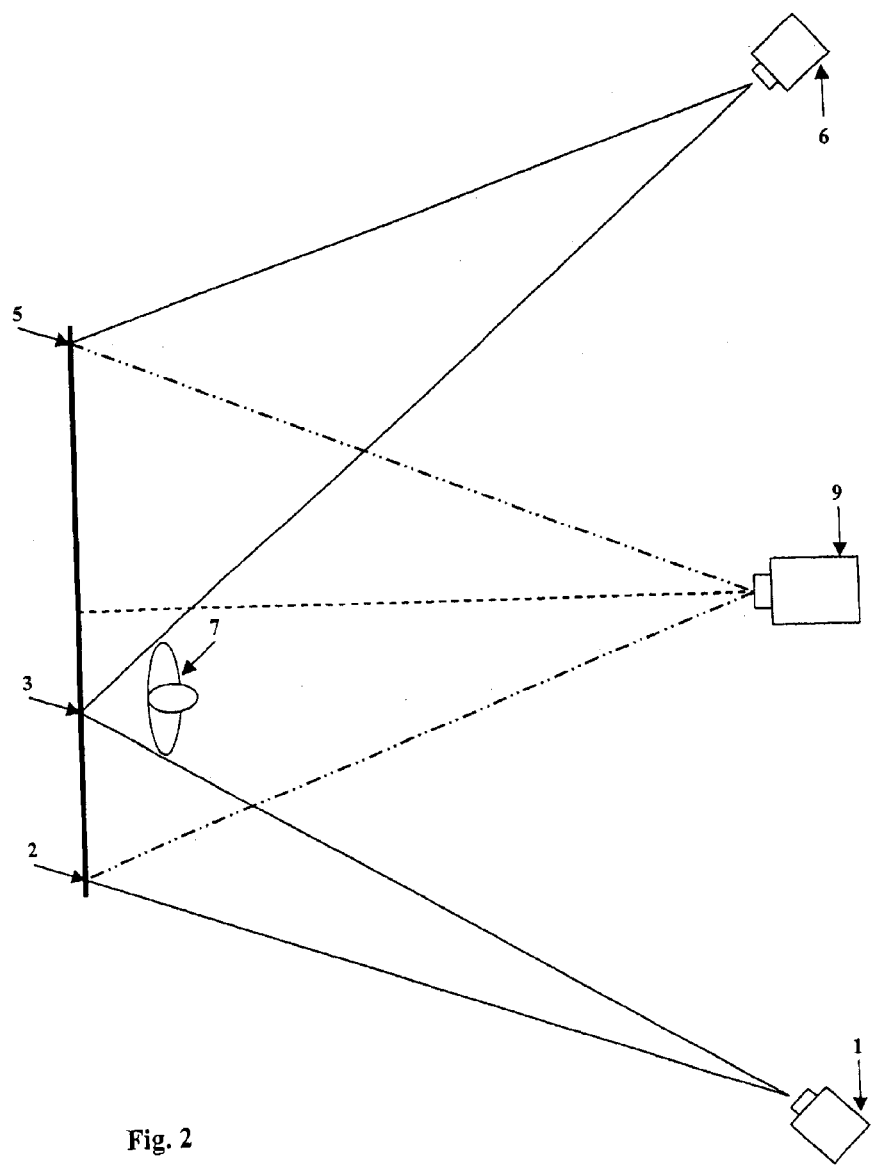
FIG. 2 is a plan view showing the placement of a presenter before a front projection screen and the location of two electronic projectors and one central infrared camera.

The preferred method of implementing shadow-less projection has been described above. Another embodiment using only one infrared camera and illuminator is illustrated in FIG. 2. The infrared camera 9 detects the presenter's silhouette for computing the center of mass. It is this center of mass that is used to locate point 3 on the projection screen directly behind the center of the presenter. The left and right portions of the projected image will join on the screen behind the presenter at point 3, and this join line will track the presenter as he moves about in front of the screen.

The single camera 9 is satisfactory for tracking the presenter's position and establishing the projection join line 3. An inhibit signal generated from position 9 will not match the presenter's silhouette as seen from projector positions 1 and 6. Therefore the presenter's silhouette as seen from the single central infrared camera 9 cannot be used to inhibit projection onto the presenters arm when extended into either projection beam.

This system, having only one infrared camera and illuminator, will cost less and will be quite satisfactory for most applications. Since no projector light falls onto the presenter's body, he may look directly at his audience without suffering the blinding glare of the projectors.

Figure 3:
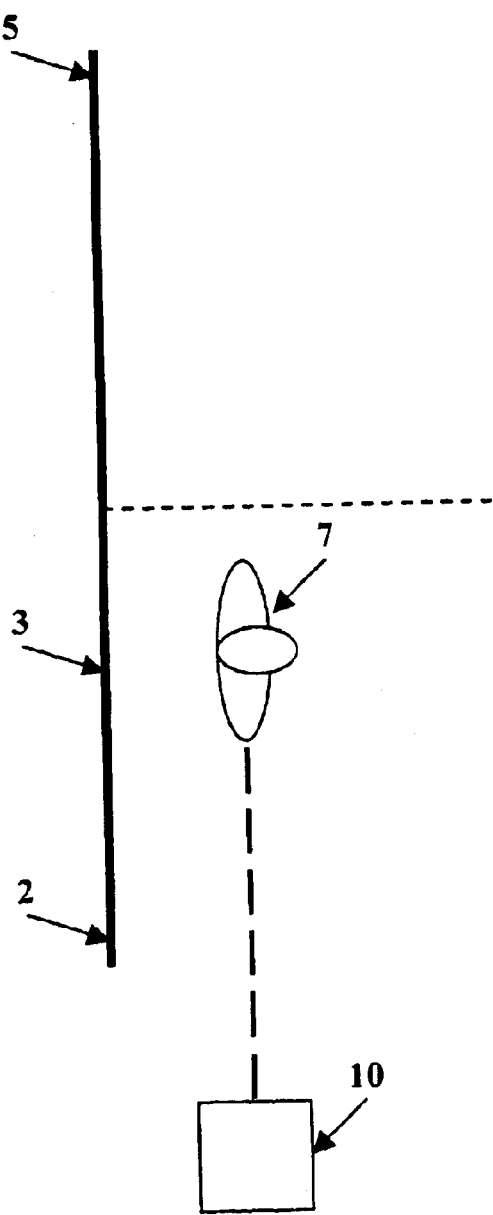
FIG. 3 is a plan view showing the placement of a presenter before a front projection screen and a range finder at one edge of the projection screen.

FIG. 3 illustrates the use of a range finder 10 at one edge of the screen such as is used in some cameras for automatically determining focus distance. This device is adequate for detecting the distance to the near edge of the presenter 7 with respect to the screen edge. Adding half the with of the presenters body, to the range finder's indicated range, locates the approximate center of mass, and is acceptable for locating the join line position behind the presenter.

The range finder option may be less costly than the single infrared camera of FIG. 2 for locating a join line behind the presenter. A second range finder located at the opposite edge of the screen will improve range accuracy for very wide screens. Since a range finder has a minimum range within which it does not measure, the range finder should be located beyond the screen edge by at least this amount.

As in the case of the central single infrared camera of FIG. 2, the range finder option of FIG. 3 results in an improved projection system without screen shadows. The range finder permits the dual projectors to track the presenter and join their projected image segments behind the presenter as he moves about in front of the screen. Since no projector light falls onto the presenter, he may look directly at his audience without suffering the blinding glare of the projectors.

I claim:

1. A method for projecting an image onto a projection screen without said image being projected onto a presenter moving about in front of said screen, and without said presenter casting a shadow, said method comprised of the following steps,
   a) generating a left and right correction of an image simultaneously projected onto said screen from each of two positions using respective first and second projectors that are off-axis on opposite sides of the centerline of said screen and where both projections of said image register on said screen as a single image,
   b) generating a center of mass of said presenter's silhouette,
   c) locating a vertical join line on said screen directly behind said presenters center of mass,
   d) inhibiting that portion of the projected image from the first projector that extends to the right of said join-line,
   e) inhibiting that portion of the projected image from the second projector that extends to the left of said join-line thereby providing the full projected image on the screen from the left and right image segments, without either segment projecting said image onto said presenter, and without casting said presenter's shadow onto the screen.

2. The method of claim 1 wherein said correction is rectilinear.

3. The method of claim 1 in which said presenter is spaced away from said screen by at least 18 inches.

4. The method of claim 1 in which said projectors are disposed above a viewing audience and beyond the left and right edges of said projection screen.

5. The method of claim 1 in which said center of mass of said presenter is the average of two centers of mass determined from two infrared images of the presenter obtained by an infrared illuminator and camera in proximity to each of said two image projectors.

6. The method of claim 1 in which said center of mass is obtained from a single infrared silhouette obtained from an infrared camera located on screen center.

7. The method of claim 1 in which said center of mass is determined by a range finder located at one of the left and right edge of said projection screen.

8. The method of claim 7 in which a range finder is located at both the left and right edges of said screen to improve the accuracy of locating said presenter's center of mass.

9. The method of claim 1 in which a silhouette of said presenter is obtained from infrared cameras at both left and right projection positions and all pixels in said silhouettes are continuously inhibited to prevent projection onto a part of said presenter extending into a projection beam.

10. The method of claim 9 in which all pixels inhibited in said silhouettes are assigned RGB levels to supplement the illumination on a presenter in a dimly lighted auditorium.

11. The method of claim 10 in which said assigned RGB levels represent one of white light and colored light.

12. The method of claim 2 in which said projectors are off-axis from said screen to the left and right of said screen center and are off-axis vertically from said screen center.

13. The method of claim 12 in which said rectilinear correction is applied to both projected images in both the horizontal and vertical axes.

14. The method of claim 1 in which both the right and left segments of said projected image overlap the join line as a dissolve thereby making said joining of the two image segments less visible.

15. The method of claim 2 in which a luminance correction is made to each of the rectilinear corrected images to compensate for the luminance difference generated by said rectilinear correction and in off-axis projection distance between the near and far side of the projection screen, and in projector optics.

16. The method of claim 15 in which said luminance correction is made to the rectilinear corrected image before said image is projected, and where said luminance correction is the inverse of the RGB variance of the projectors on-screen luminance distribution pattern when projecting a white field.

17. The method of claim 16 in which said luminance correction is a full field correction made independently for each projector.

* * * * *